US012803434B2

(12) United States Patent
Gradischnig et al.

(10) Patent No.: US 12,803,434 B2
(45) Date of Patent: Nov. 17, 2026

(54) SWITCHED-MODE POWER SUPPLY WITH TWO POWER OUTPUTS

(71) Applicant: Murrelektronik GmbH, Oppenweiler (DE)

(72) Inventors: Robert Gradischnig, Grassnitzberg (AT); Jani Hiltunen, Jokela (FI)

(73) Assignee: Murrelektronik GmbH, Oppenweiler (DE)

( * ) Notice: Subject to any disclaimer, the term of this patent is extended or adjusted under 35 U.S.C. 154(b) by 827 days.

(21) Appl. No.: 18/158,908

(22) Filed: Jan. 24, 2023

(65) Prior Publication Data

US 2023/0238879 A1 Jul. 27, 2023

(30) Foreign Application Priority Data

Jan. 24, 2022 (EP) ..................................... 22153003

(51) Int. Cl.
*H02M 3/156* (2006.01)
*H02M 1/00* (2006.01)

(52) U.S. Cl.
CPC ......... *H02M 3/156* (2013.01); *H02M 1/0025* (2021.05); *H02M 1/0032* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088;

(Continued)

(56) References Cited

U.S. PATENT DOCUMENTS 5,821,636 A * 10/1998 Baker ........................ H02J 3/38 307/64
6,920,056 B2 * 7/2005 MacDonald ............ G06F 1/263 363/142

(Continued)

FOREIGN PATENT DOCUMENTS

DE 10 2020 007 348 A1 6/2021

*Primary Examiner* — Jeffrey A Gblende
(74) *Attorney, Agent, or Firm* — Walter Ottesen, P.A.

(57) ABSTRACT

A switched-mode power supply for use in an intralogistics system for goods has a housing with a first power output with a first operating voltage for first electrical consumers. The housing of the switched-mode power supply has at least a second power output with a second operating voltage for second electrical consumers. The second operating voltage at the second power output is greater than the first operating voltage at the first power output.

15 Claims, 2 Drawing Sheets

(58) Field of Classification Search
CPC ... H02M 1/0048; H05B 39/048; B23K 11/24; H04B 2215/069
See application file for complete search history.

(56) References Cited

U.S. PATENT DOCUMENTS

| | | | | |
|---|---|---|---|---|
| 10,009,973 | B1 * | 6/2018 | Wray | H05B 45/10 |
| 11,799,311 | B2 * | 10/2023 | Quek | H02J 1/106 |
| 12,316,122 | B2 * | 5/2025 | Higaki | H02J 1/06 |
| 2005/0029872 | A1 * | 2/2005 | Ehrman | H02M 1/32 307/11 |
| 2011/0057724 | A1 * | 3/2011 | Pabon | H02M 7/219 307/31 |
| 2022/0410719 | A1 | 12/2022 | Schaefer et al. | |

* cited by examiner

SWITCHED-MODE POWER SUPPLY WITH TWO POWER OUTPUTS

CROSS-REFERENCE TO RELATED APPLICATIONS

This application claims priority of European patent application no. 22153003.3, filed Jan. 24, 2022, the entire content of which is incorporated herein by reference.

TECHNICAL FIELD

The disclosure relates to a switched-mode power supply having a closed housing and a first power output with a first operating voltage for first electrical consumers.

BACKGROUND

A switched-mode power supply includes an electronic module that converts an unstabilized input voltage, in particular a mains voltage from a supplier, into a constant output voltage (DC voltage). The mains voltage is rectified and chopped into a higher frequency of the voltage via an electronic switch and rectified to a desired output voltage via a DC link. A galvanic isolation which is usually provided between the mains voltage and the output voltage is conveniently carried out via a power transformer in the form of a transformer. The switched-mode power supply provides a stabilized output voltage for operating consumers.

In the intralogistics of logistical material and goods flows on conveyor tracks, for example, roller conveyors, belt conveyors or similar conveyor devices are used. An intralogistics system usually includes a plurality of roller conveyors arranged sequentially. In a roller conveyor, a plurality of conveyor rollers are located adjacent to each other, of which at least one roller conveyor is driven by an electric motor. A driving electric motor can be integrated in a roller conveyor or can also be provided as an external electric motor.

In a belt conveyor, an endless conveyor belt runs over a drive roller, which is driven by an integrated electric motor or an external electric motor.

The systems used in intralogistics have a large spatial extent and are equipped with a plurality of sensors (for example, light barriers, reed contacts, mechanical contacts or the like) and a plurality of actuators (for example, electric motors, electromagnets, display devices or the like). Individual actuators can have a high electrical power consumption. Especially for the transport of heavy goods, workpieces or heavy materials, the electric motors must provide sufficient drive power.

All actuators and sensors are operated with the same supply voltage as standard. In intralogistics, a DC voltage of 24 V is usually used for all actuators and sensors, wherein a high power consumption of the electric motors used causes correspondingly high currents, which requires an appropriate dimensioning and routing of the electrical cabling.

SUMMARY

It is an object of the disclosure to configure the energy supply of an existing intralogistics plant with only minor investment in such a way that, with optimized current consumption of actuators such as, for example, electric drive motors, the continued use of existing standard sensors is possible.

The above object is achieved by a switched-mode power supply having a closed housing, which has a first power output with a first operating voltage for first electrical consumers and at least one second power output with a second operating voltage for second electrical consumers. The second operating voltage for second electrical consumers is greater than the first operating voltage at the first power output of the switched-mode power supply.

A switched-mode power supply configured in this way having at least two power outputs with two different operating voltages enables the user to replace an existing power supply with, for example, 24 V nominal voltage by a switched-mode power supply according to the disclosure with a first operating voltage of, for example, 24 V and a second operating voltage of, for example, 36 V or 48 V. First consumers with low power consumption, such as sensors or the like, can remain connected via electrical cables to the first power output of the switched-mode power supply in order to continue to be operated with the original operating voltage of, for example, 24 V on the switched-mode power supply according to the disclosure, without any changes having to be made to the installation of the system. Second consumers of the system with higher power consumption, such as driving electric motors or the like, can be connected to the second power output separately from the network of the original operating voltage for supplying power with the second operating voltage, in order to be operated with the higher second operating voltage of the switched-mode power supply according to the disclosure. Despite an increased power consumption of an electric motor, this can certainly be operated with the higher second operating voltage at the second power output of the switched-mode power supply according to the disclosure, with unchanged or extended cabling. It may be practical to replace existing electric motors by electric motors with a higher nominal voltage.

It may be advantageous that the second operating voltage is a multiple, in particular an integer multiple, of the first operating voltage. For example, the first operating voltage can have a nominal value of 24 V and the second operating voltage can have a nominal value of 48 V. Ratios other than integer ratios of the operating voltages to each other may also be practical.

Advantageously, a control element is arranged in the housing of the switched-mode power supply. The control element is configured to change at least one of the operating voltages of a power output of the switched-mode power supply. This can be advantageous for adjusting the nominal voltage at the power output if the second operating voltage provided is at risk of dropping, for example, due to an increased power requirement.

In an extension of the disclosure, it is provided that an electronic fuse is provided in the housing of the switched-mode power supply, which is configured to electrically protect at least one power output of the switched-mode power supply. Advantageously, a limit value is input into the electronic fuse, wherein the electronic fuse is configured to lower the electrical power output on the monitored power output if the input limit value is exceeded. In particular, provision is made to switch off the power output if the input limit value is exceeded.

In a practical extension of the disclosure, the electronic fuse is configured in such a way that when the input limit value is exceeded, the electrical power output at the monitored power output is monitored according to an adjustable operating characteristic. It may be practical in this case to limit the flowing current to a maximum value according to a predefinable operating characteristic. The current can also be advantageously set to a predetermined average value over time, for example, by pulse width modulation. In a simple embodiment, the operating characteristic is selected such that when a limit value is exceeded, the current path is opened, that is, the flowing current is switched off.

For optical monitoring of the switched-mode power supply, it may be advantageous to provide an externally readable display device in the housing of the switched-mode power supply, which is capable of displaying the state of at least one power output, advantageously of all power outputs.

In intralogistics plants and systems, the flow of goods is accelerated, slowed down, or raised or lowered from a first level to a second level. The energy generated when the conveyed material is slowed down or lowered to a lower level drives the electric motor in the conveyor track mechanically, so that this electric motor now operates as a generator and feeds a generator current into the system. In a particular embodiment of the disclosure, the switched-mode power supply is configured to be regenerative. Regenerative means that a current flowing in through a power output can be processed without an inflowing current causing electrical damage within the switched-mode power supply. The switched-mode power supply is configured according to the disclosure such that an electric current flowing into the switched-mode power supply through a power output is fed back into the supply network at the input of the switched-mode power supply. Alternatively or in addition, electrical current flowing into the switched-mode power supply can also be supplied to a further consumer connected to the switched-mode power supply to supply power to it.

Thus, the switched-mode power supply can be configured such that a current flowing into the switched-mode power supply via one of the power outputs is used to supply power to another power output of the switched-mode power supply, in particular to connect to the other power output. This allows a favorable energy balance to be achieved. Advantageously, the electrical energy of the generator current flowing into the switched-mode power supply can also be stored in a temporary store, for example, a rechargeable battery, a capacitor such as a supercap, or the like. One or the other power output can be supplied with the stored energy from the temporary store. The entire system can thus be operated in an energy-saving manner.

It may also be advantageous to electrically dissipate a generator current flowing into the switched-mode power supply, for example, with a braking resistor arranged in the housing of the switched-mode power supply.

In a particular extension of the switched-mode power supply according to the disclosure, a communication unit is incorporated in the housing of the switched-mode power supply. The communication unit is configured to transmit operating data of at least one power output, preferably of both or all power outputs of the switched-mode power supply such as current, voltage, power, temperature, et cetera, to an in particular higher-level central controller, in particular to communicate this data outside of the switched-mode power supply or the system. This is advantageously carried out via a suitable communication interface or a suitable communication bus. Interfaces such as IO-Link, RS-232 or USB can be used as the communication interface.

In particular, the communication unit is configured in such a way that operating data of the switched-mode power supply such as current, voltage, power or the like can be modified by external intervention via the communication unit.

Preferably, the communication unit is configured in such a way that it is to be operated in the communication bus as a slave and/or as a master.

BRIEF DESCRIPTION OF DRAWINGS

The invention will now be described with reference to the drawings wherein.

DETAILED DESCRIPTION

Figure 1:
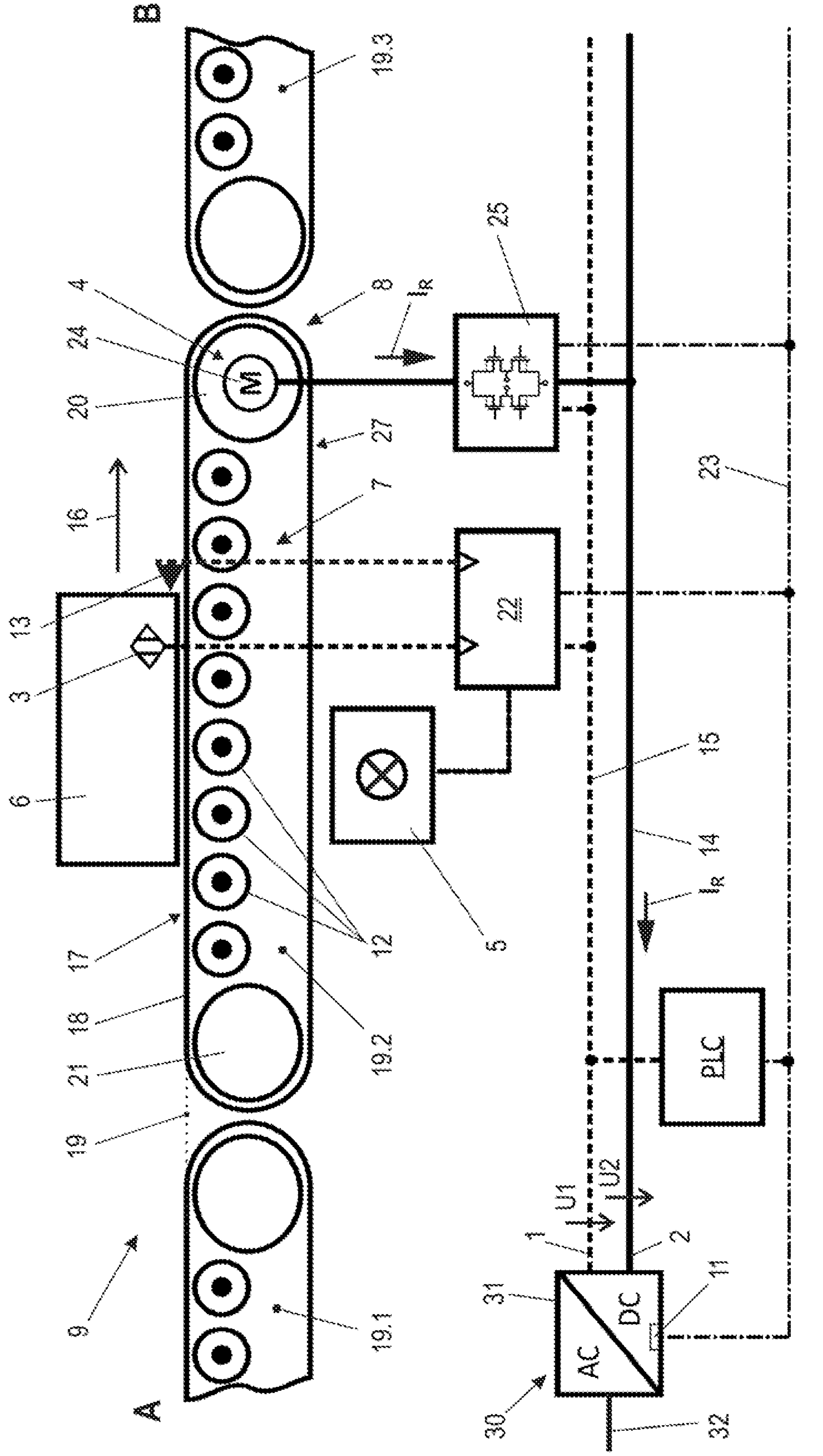
FIG. 1 shows a schematic representation of an intralogistics system with a conveyor track composed of belt conveyors; and, FIG. 2 shows a schematic block circuit diagram of a switched-mode power supply according to the disclosure.

The embodiment according to FIG. 1 schematically shows an intralogistics system 9. A conveyor track 19 is shown schematically, which in the illustrated embodiment is composed of belt conveyors 19.1 to 19.3 arranged sequentially in the conveying direction 16. The belt conveyors 19.1, 19.2, 19.3 shown in FIG. 1 are advantageously configured identically. Instead of or in combination with the belt conveyors 19.1 to 19.3 shown, roller conveyors or similar conveying devices can also be used.

The basic structure of a belt conveyor is described using the example of the belt conveyor 19.2. A belt conveyor 19.2 essentially includes an endless conveyor belt 18, the tight strand 17 of which is supported via a plurality of support rollers 12 located adjacent to one another in the conveying direction 16 for supporting a weight load. The conveyor belt 18 is driven by a drive roller 20, which is driven by an actuator 4 configured as an electric motor 24. The conveyor belt 18 passes from the slack strand 27 to the tight strand 17 via a further deflection roller 21. The conveyor belt 18 wraps around the drive roller 20 and the deflection roller 21 in an endless loop.

On the conveyor track 19, a product 6 such as, for example, material, bulk material or the like, is transported from A to B. Sensors 3, 13 and actuators 4 are provided to control the flow of goods. In the illustrated embodiment, for example, a light barrier is provided as the sensor 3 for detecting the presence and/or position of goods 6 on the conveyor belt 18. In addition or alternatively, a mechanical sensor 13 in the form of a mechanical electrical contact can detect the position of the goods 6 on the conveyor track 19. The sensor 3 and/or the sensor 13 is connected to a communication bus 23 via an interface module 22, so that the sensor output signals are available to a central controller PLC. The central controller can be a locally provided controller, for example, a PC. The controller can also be provided via a cloud or similar.

The interface module 22 may additionally be equipped with a display device 5, via which a response of the sensor 3 configured as a light barrier or the sensor 13 configured as an electrical contact is visually displayed.

The electric motor 24 driving the conveyor track 19, in the embodiment the drive roller 20 of the conveyor belt 18 of the belt conveyor 19.2, forms an actuator 4 of the intralogistics system 9. The electric motor 24 is controlled by a motor controller 25 of the central controller PLC via the communication bus 23.

For supplying electrical power to the system 9 a switched-mode power supply 30 is provided, which is arranged in an in particular closed housing 31. The switched-mode power supply 30 has an input 32 for a mains voltage of, for example, 230 V. The switched-mode power supply 30 has a first power output 1 with a first operating voltage U1 and a second power output 2 with a second operating voltage U2. The operating voltage U2 at the second power output 2 is greater than the operating voltage U1 at the first power output. It may also be practical to configure the operating voltage U1 to be greater than the operating voltage U2. In an embodiment of the disclosure, the switched-mode power supply 30 has at least two power outputs 1 and 2. The switched-mode power supply 30 can also have more, for example, three, four or more power outputs, as indicated in FIG. 1 by dashed lines. The power outputs can be configured with operating voltages of the same or different sizes.

The switched-mode power supply 30 is intended in particular for use in conveyor systems or production systems in which a plurality of sensors 3, 13 and actuators 4, in particular electric motors 24, are provided. Since actuators 4 provided as electric motors 24 have a significantly higher power requirement than sensors 3, 13, it is provided that the first power output 1 with the in particular lower operating voltage U1 feeds in particular sensors 3, 13 as first electrical consumers 7. The second power output 2 with the higher operating voltage U2 is provided for supplying electrical power to actuators 4 with a higher power requirement, which form second consumers 8 in particular of the conveyor or production system. Due to the increased operating voltage U2 compared to the operating voltage U1, an increased electrical power can be provided for actuators 4 at the same current. The switched-mode power supply 30 according to the disclosure is thus used to supply power to distributed consumers including sensors 3, 13 and/or actuators 4 in particular in an intralogistics system 9 for transporting material and/or goods 6 on a conveyor belt 18. For this purpose, as FIG. 1 shows, first consumers 7 with a low power requirement, for example, sensors 3, 13 are connected via a first electrical cable 15 to the first power output 1 of the switched-mode power supply 30. Actuators 4, for example, driving electric motors 24, with a higher electrical power requirement are connected via electrical cables 14 to the second power output 2 of the switched-mode power supply 30.

The operating voltages U1 and U2 of the power outputs 1 and 2 are dimensioned such that the second operating voltage U2 is a multiple of the first operating voltage U1. The multiple can be, in particular, an integer multiple. In the embodiment shown, the first operating voltage U1 has a nominal value of 24 V; the second operating voltage U2 has a nominal value of 48 V, which is twice as large as the first operating voltage U1.

In FIG. 1 the power output 1 of the switched-mode power supply 30 is shown by dashed lines. The power output 2 of the switched-mode power supply 30 is indicated by a solid line. The communication bus 23 for sensing the sensor signals and/or for data exchange and in particular for controlling the actuators 4 is drawn with a dash-dotted line. Instead of a communication bus 23, an IO-Link, RS-232 or USB connection can also be provided as a communication interface. An IO-Link system includes an IO-Link master and one or more IO-Link sensors or actuators. The IO-Link master provides the interface to a higher-level controller PLC and controls the communication with the connected IO-Link devices. RS-232 (Recommended Standard 232) is a serial interface standard. USB is a Universal Serial Bus (USB).

As shown in FIG. 1, the central controller PLC as well as the motor controller 25 of the actuator 4 configured as an electric motor 24 and the interface module 22 for communication of the sensors 3 and 13 with the communication bus 23 is connected to the first power output 1, since these components have only a low power requirement. Only the controller operated by the motor controller 25 is connected via cables 15 to the second power output 2 of the switched-mode power supply 30. Due to the higher operating voltage U2 with a nominal value of, for example, 48 V, the current strength in the supplying electrical cable 14 decreases, in this example by half, for the same power consumption as when operating at 24 V. Using the cables 14 laid for a nominal voltage of 24 V, the electric motor 24 can be operated with a higher electrical power with the same cross-section of the cables 14.

Figure 2:
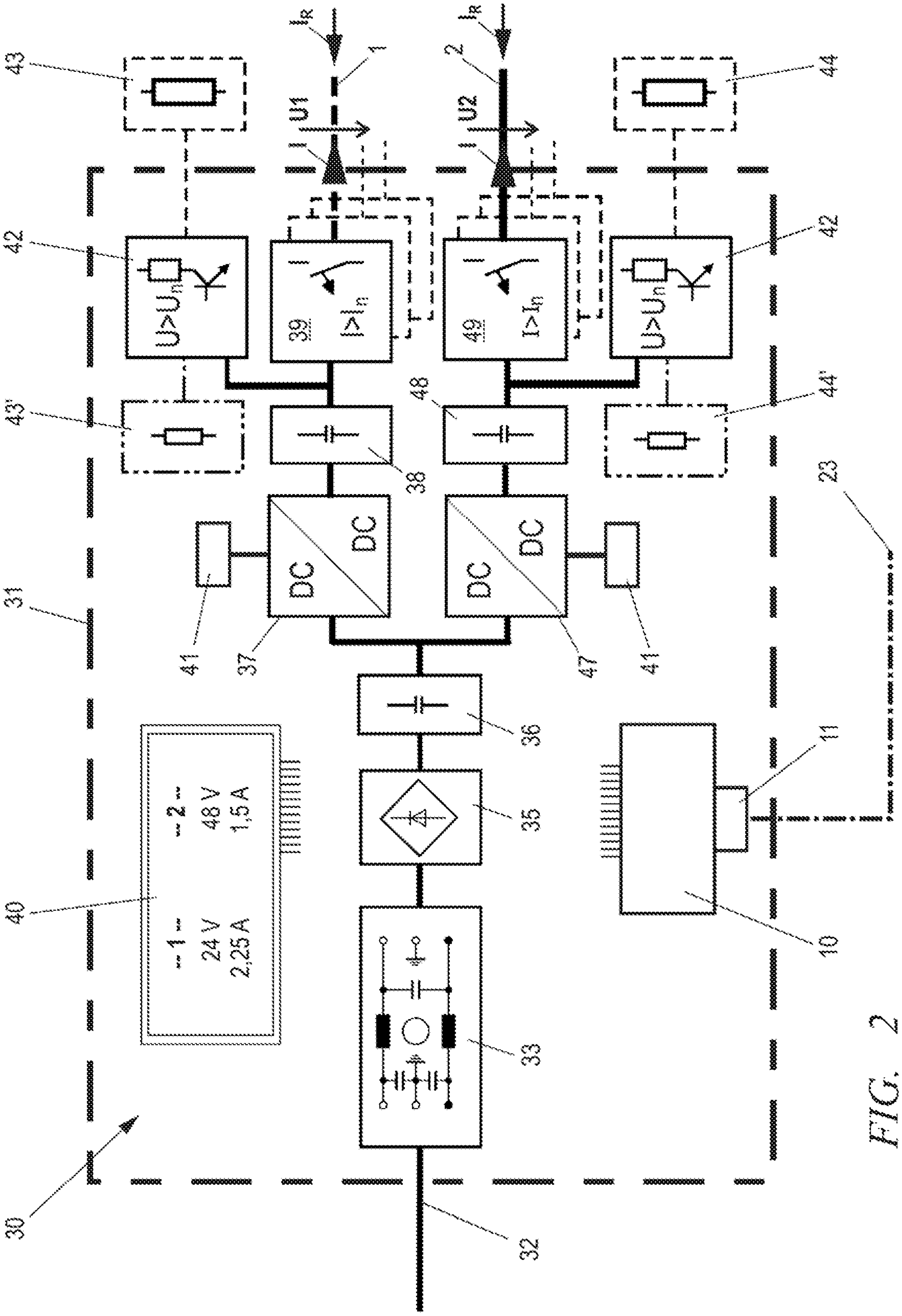

FIG. 2 depicts a block circuit diagram of a switched-mode power supply 30 according to the disclosure. The switched-mode power supply 30 is arranged in an in particular closed housing 31. The housing 31 has an input 32 for applying a mains voltage of, for example, 230 V. The normally AC mains voltage of, for example, 230V present at the input 32 is converted to a DC voltage DC via a rectifier 35 and the screen capacitor 36. The DC voltage is chopped in the downstream DC/DC converters 37 and 47 and is fed via the DC/DC converters 37 and 47 to the low-voltage side of, for example, 24V and 48V. The interference caused by the switching of the DC/DC converters 37 and 47 is attenuated by the line filter 33. On the low-voltage side, the regulated DC voltage of the DC/DC converters 37 and 47 is fed to a DC link capacitor 38 and 48 respectively. Via a fuse 39, 49, which is configured in particular as an electronic fuse, the respective power output 1 or 2 is operated with the nominal voltages U1 of, for example, 24V and U2 of, for example, 48V set via the DC/DC converters on the low-voltage side.

Advantageously, the housing 31 of the switched-mode power supply 30 includes a display device 40, which is capable of indicating the state of a power output 1 and/or 2. Thus, the display device 40 can display the operating voltage provided at the power output 1 and/or 2 as a nominal value and/or a current currently flowing at the power output 1 and/or 2 so that they can be read by a user.

To stabilize the operating voltages U1 and U2 provided at the power outputs 1 and/or 2, a control element 41 can be provided, which monitors the nominal voltage at the power output 1 and/or 2 and adjusts it if necessary. The control element 41 communicates with a communication unit 10 provided in the housing 31 of the switched-mode power supply 30, which means external interventions by a user or a controller are possible. The communication unit 10 is connected to a communication interface or to a communication bus 23 and is configured to communicate operating data of at least one power output 1 and/or 2 of the switched-mode power supply 30 to the outside. For this purpose—as indicated in FIG. 2 on the communication unit 10—detection of the current of a power output, the voltage of a power output, the power delivered by a power output, the temperature of various components of the switched-mode power supply, the state of a fuse 39, 49 or the like is provided. The communication unit 10 and a communication interface connected to it or a communication bus 23 connected to it also allow external interventions in the switched-mode power supply 30. For this purpose, the communication unit 10 has an interface 11 for the communication bus 23. The communication unit 10 is configured in such a way that it can be operated in the communication bus both as a slave and/or as a master. The communication unit 10 is configured in such a way that operating data of the switched-mode power supply 30 can be changed between current, voltage, power or the like via the communication unit 10.

A limit value for a maximum operating current $I_n$ is specified for each fuse 39, 49. In a simple configuration of the fuse 39, 49 it is provided that if the operating current I exceeds the specified limit value for the maximum operating current $I_n$ the fuse 39, 49 switches off the corresponding power output 1 or 2. The fuse 39, 49 can also be configured as an electronic fuse in such a way that, if the set limit value for the maximum operating current $I_n$ is exceeded, the fuse lowers the electrical current output on the monitored power output 1 or 2. If the fuse is configured as an electronic fuse 39, 49 it is also possible to provide an operating characteristic in order to influence, in particular to switch off, the electrical current of the respective power output 1 or 2 if the limit value for the maximum operating current $I_n$ is exceeded. The configuration as an electronic fuse also has the advantage that if the current operating current I falls below the limit value for the maximum operating current $I_n$, in particular, an automatic restoration of the power output 1 or 2 can be provided. It may be practical to switch on the electronic fuse again after a predetermined period of time has elapsed after the current has been switched off. If the current rises above the limit value again, it is switched off again.

If the electric motor 24 is throttled in its rotational speed to reduce the speed of the product 6 in the conveying direction 16, the kinetic energy of the product transported on the conveyor track 19 can have a driving effect on the electric motor 24, so that it operates briefly as a generator. This can give rise to a current $I_R$ flowing into the switched-mode power supply 30, as shown schematically in FIGS. 1 and 2. According to the disclosure, the switched-mode power supply 30 is configured to be regenerative. If an electrical current $I_R$ flows in the direction of the switched-mode power supply 30 to a power output 1 and/or 2 due to an electric motor 24 operating in generator mode, the switched-mode power supply 30 can supply this incoming current $I_R$ to the supply network, for example, at the input 32. It may also be practical to supply the current $I_R$ flowing into the switched-mode power supply 30 to additional consumers 7, 8 in order to support the supply of power to them. In a particular manner, the switched-mode power supply 30 is configured to connect a current $I_R$ flowing into the switched-mode power supply 30 via one of the power outputs 1 or 2 to another power output 2 or 1 of the switched-mode power supply 30 to supply power. It may also be practical to arrange a braking resistor 43, 44 in the housing 31 of the switched-mode power supply 30. A current $I_R$ flowing in via a power output 1, 2 can then be dissipated via the braking resistor 43, 44.

The generator operation of an electric motor 24 can lead to an increased voltage on the power output 1 or 2, which is detected by a monitoring circuit 42. If the current operating voltage U exceeds the designated nominal value $U_n$ of the nominal voltage to be output on the power output 1 or 2, the braking resistor 43 or 44 provided in the housing 31 can be switched into the circuit, via which the supplied power is then dissipated. The operating voltages U1 and U2 are kept constant. In the embodiment according to FIG. 2, the braking resistors 43' and 44' are arranged inside the housing 31 of the switched-mode power supply 30. If a high power is expected from regenerative operating states of an actuator 4 or an electric motor 24, it may be practical to provide the braking resistors 43 and 44 outside the housing 31 of the switched-mode power supply 30.

Instead of a conversion of the regenerative energy generated during braking into heat via a braking resistor 43, 44 or 43', 44', the feedback of the current $I_R$ described above into the supply network and/or into a power output 1 or 2 is advantageously preferred. Thus, any electrical energy flowing to the switched-mode power supply 30 via one of the power outputs 1 and/or 2 can be used to supply power to another power output 1 and/or 2, thus via the DC link capacitor 38 or 48 assigned to the power output. Thus, the electrical energy flowing to the switched-mode power supply 30 via a power output 1 or 2 can be transferred, for example, from a DC link capacitor 38 of the one power output 1 to the other DC link capacitor 48 of the other power output 2.

The electrical energy flowing to the switched-mode power supply can also be stored in a temporary store, for example, a rechargeable battery, a capacitor such as a supercap or the like. The stored energy can be extracted from the temporary store again if necessary. An energy-saving operation is possible.

The housing 31 of the switched-mode power supply 30 is advantageously configured such that it is suitable for tool-free mounting or dismounting on, for example, a DIN rail in a control cabinet. Screw fastenings of the housing 31 to a carrier can also be practical.

It is understood that the foregoing description is that of the preferred embodiments of the invention and that various changes and modifications may be made thereto without departing from the spirit and scope of the invention as defined in the appended claims.

The invention claimed is:

1. A switched-mode power supply arrangement for supplying power to distributed consumers, the switched-mode power supply arrangement comprising:

said consumers including at least one of sensors and actuators;

a housing;

a switched-mode power supply arranged in said housing;

said housing having a first power output providing a first operating voltage (U1) for a first one of said consumers;

said housing having a second power output providing a second operating voltage (U2) for a second one of said consumers; and, said second operating voltage (U2) at said second power output being greater than said first operating voltage (U1) at said first power output;

an electronic fuse incorporated in said housing and being configured to electrically protect at least one of said first and second power outputs of said housing;

wherein at least one of said first power output and said second power output is a monitored power output; a limit value ($I_n$) is input into said electronic fuse; and, said electronic fuse is configured to lower electrical power output on said monitored power output when said input limit value ($I_n$) is exceeded.

2. The switched-mode power supply arrangement of claim 1, wherein a limit value ($I_n$) is input into said electronic fuse and said electronic fuse is configured to switch off said monitored power output when said input limit value ($I_n$) is exceeded.

3. The switched-mode power supply arrangement of claim 1, wherein said electronic fuse is configured to change flowing current according to an adjustable operating characteristic to so adjust electrical power of said first power output and said second power output to: limit the current to a predefined value, set the current to a predefined average value over time, or switch off the current.

4. The switched-mode power supply arrangement of claim 1, wherein said housing has an externally readable display device configured to indicate the state of at least one of said first and second power outputs.

5. The switched-mode power supply arrangement of claim 1, further comprising:

an intralogistics system for conveying materials and/or goods on a conveyor track;

said switched-mode power supply being installed in said intralogistics system and being configured to supply electric power to at least one of said first and second consumers; and, said first one of said consumers of said intralogistics system is connected to said first power output for supplying power thereto at said first operating voltage (U1) and said second one of said consumers of said intralogistics system is connected to said second power output for supplying power thereto at said second operating voltage (U2).

6. The switched-mode power supply arrangement of claim 1, wherein said second operating voltage (U2) is an integer multiple of said first operating voltage (U1).

7. The switched-mode power supply arrangement of claim 1, wherein said first operating voltage (U1) has a nominal value of 24 volts and said second operating voltage (U2) has a nominal value of 48 volts.

8. The switched-mode power supply arrangement of claim 1, further comprising:

a control element arranged in said housing; and, said control element being configured to change at least one of said first and second operating voltages (U1, U2) of corresponding ones of said first and second power outputs.

9. A switched-mode power supply arrangement for supplying power to distributed consumers, the switched-mode power supply arrangement comprising:

said consumers including at least one of sensors and actuators;

a housing;

a switched-mode power supply arranged in said housing;

said housing having a first power output providing a first operating voltage (U1) for a first one of said consumers;

said housing having a second power output providing a second operating voltage (U2) for a second one of said consumers; and, said second operating voltage (U2) at said second power output being greater than said first operating voltage (U1) at said first power output; and, wherein said switched-mode power supply is regenerative so as to cause an electrical current (IR) flowing into said switched-mode power supply via one of said first power output and said second power output to be supplied to a network and/or to an additional consumer connected to the switched-mode power supply.

10. A switched-mode power supply system comprising:

a switched-mode power supply arrangement for supplying power to distributed consumers, the switched-mode power supply arrangement including:

said consumers including at least one of sensors and actuators;

a housing;

a switched-mode power supply arranged in said housing;

said housing having a first power output providing a first operating voltage (U1) for a first one of said consumers;

said housing having a second power output providing a second operating voltage (U2) for a second one of said consumers;

said second operating voltage (U2) at said second power output being greater than said first operating voltage (U1) at said first power output; and, said switched-mode power supply being configured to connect a current (IR) flowing into said switched-mode power supply via said first power output to said second power output of said switched-mode power supply to supply power to said second power output.

11. The switched-mode power supply system of claim 10, further comprising a braking resistor being arranged in said housing of the switched-mode power supply, and an electrical current (IR) flowing in via one of said first and second power outputs being supplied to said braking resistor.

12. The switched-mode power supply system of claim 10, further comprising a communication unit incorporated in said housing of said switched-mode power supply; and, said communication unit being configured to communicate operating data of at least one of said first and second power outputs of said switched-mode power supply with said operating data including current (I), voltage (U), power and temperature to the outside.

13. The switched-mode power supply system of claim 12, wherein said communication unit is configured to communicate with a higher-level control unit via a communication interface or a communication bus.

14. The switched-mode power supply system of claim 12, wherein said communication unit is configured to modify operating data of said switched-mode power supply including current (I), voltage (U) and power.

15. The switched-mode power supply system of claim 12, wherein said communication unit is configured to be operated as a slave and/or as a master.

* * * * *